United States Patent Office 2,787,875
Patented Apr. 9, 1957

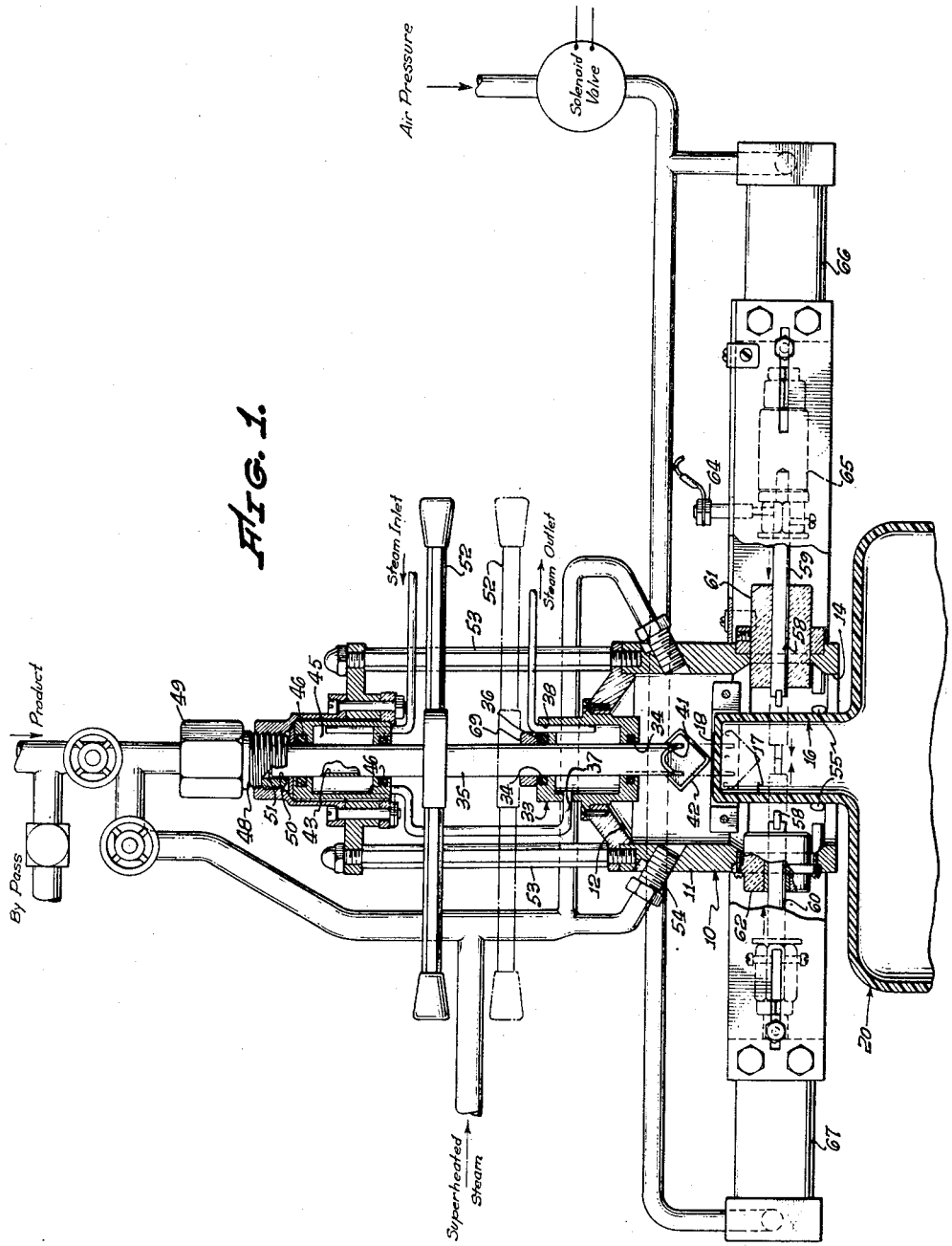

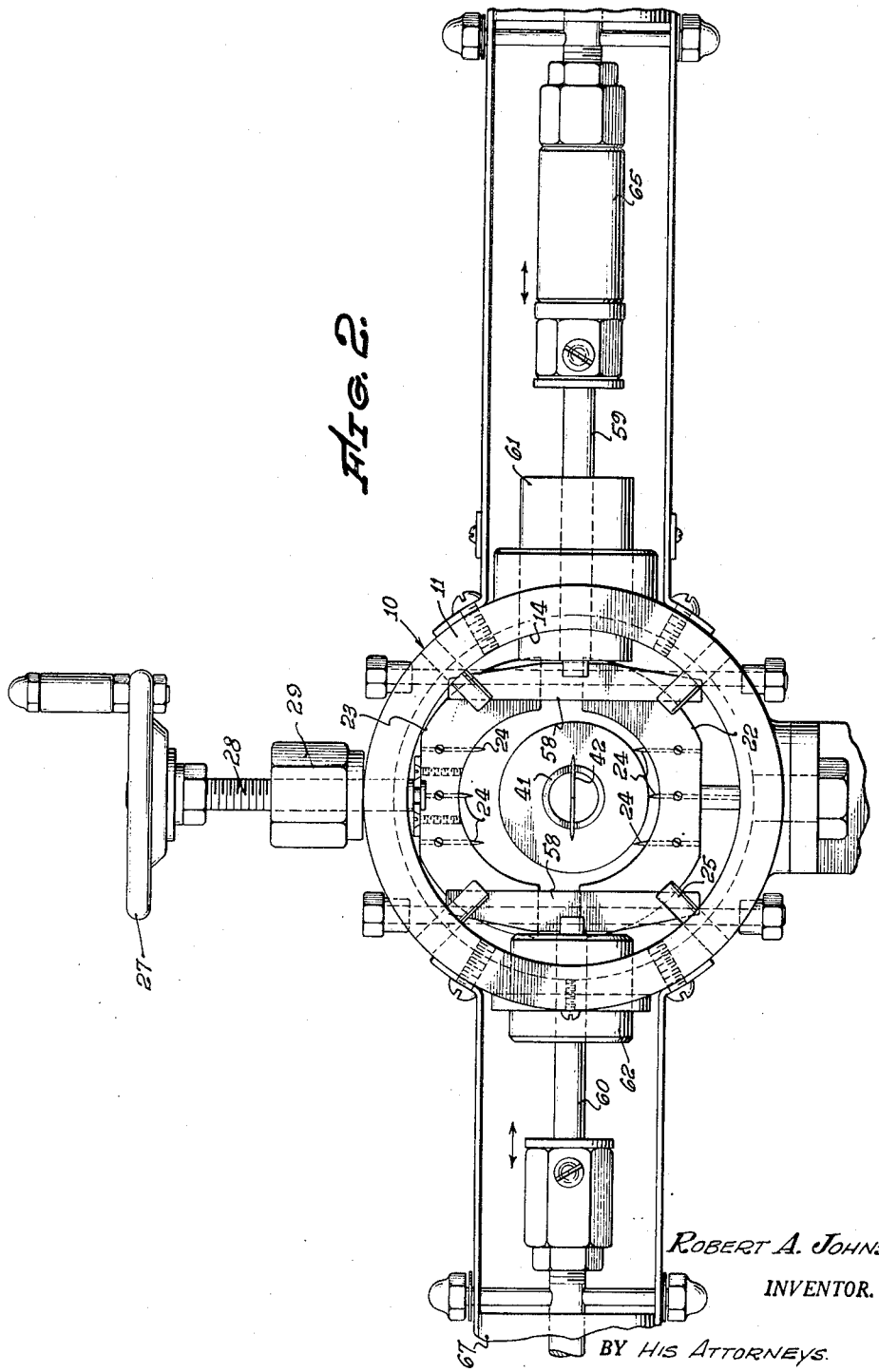

2,787,875

FILLING HEAD

Robert A. Johnson, San Jose, Calif., assignor to Aseptic Food Fillers, Inc., a corporation of California Application April 16, 1954, Serial No. 423,693

8 Claims. (Cl. 53—266)

The present invention relates to a new and improved filling head for containers. More specifically, it relates to a filling head which can be used in filling a closed, sterile container with an aseptic product.

In recent years, it has been discovered that food and other products can be canned aseptically satisfactorily and that such aseptically canned products keep for extended periods in extremely large containers. Such discoveries have extreme commercial importance inasmuch as they permit the storage of food, such as milk, tomato paste, fruit juices, soup concentrates, and the like, in very large containers until such time as it is desired to repack such substances into smaller containers for commercial sale.

In such sterile packaging processes, foods are exposed to high temperatures for a short period of time so as to render the same aseptic, are quickly cooled and then are placed within sterile containers. In one aseptically cooled canning process of the prior art, it is necessary to introduce such aseptic cooled food products into small open cans which have been rendered and maintained sterile by exposure to superheated steam. The equipment required for this procedure is extremely bulky, complicated and expensive, and, further, will handle only relatively small containers. It has not been commercially practical or feasible to employ containers of five-gallon size with processes of this type.

In order to overcome many of the defects of such prior processes, it has been proposed to employ a sterile container of any size, such as, for example, a plastic bag disposed within a supporting means, as for example, a tubular fibre drum. The container, according to this improved method of aseptic canning, is provided with an upstanding neck portion of a resinous material which may be dielectrically sealed having a flat top extremity. In filling such a container, the flat top extremity is punctured in a sterile atmosphere and an aseptic food product is then released through the puncture into the body of the container. This latter method of aseptic canning is more fully described in the copending Holsman and Potts application entitled "Means and Method for Aseptic Packaging," filed March 29, 1954, and bearing Serial No. 419,186. Unfortunately, the filling head used in the aforesaid Holsman and Potts process, while effective, has not been acceptable for all desired commercial applications. The present invention is predicated upon the teaching of an improved filling head of the broad type disclosed in this Holsman and Potts application, which is more effective than the filling head shown in it.

It is, therefore, one object of the invention to produce a filling head for containers which can easily and conveniently be used in the aseptic packaging of foods. A further and related object is to produce a filling head which is an improvement over the prior filling head used for the same purpose.

More specifically, it is an object of the invention to produce a filling head which consists of a lower hollow body portion or shell, a sliding cutter-filling tube which is designed to reciprocate in this body portion, piercing a thermoplastic container cap disposed within this body portion and introducing an aseptic product into such a container, and a sealing means to close said cap after said container is filled. A more specific object of the invention is to produce a device as described wherein the body portion is provided with means for holding a thermoplastic neck portion of said cap, and with further means for sterilizing all items within said body portion.

A further object of the invention is to provide a device with a lower body portion which is adapted to be positioned with respect to an internal sterile container so that a thermoplastic resinous cap from said container projects into an interior body cavity containing means for puncturing the neck of said cap and filling said container means for holding said neck in a fixed position, means for sealing said neck below any puncture therein, and means for sterilizing the interior of said cavity and the exterior of said neck. A still further object of the invention is to provide a device as defined in the preceding sentence wherein further means are used to sterilize said means for puncturing and filling during use.

Other objects of the invention, as well as the advantages of it, will be more fully apparent in the balance of this specification, including the appended claims and the accompanying drawings, in which:

Fig. 1 is a vertical sectional view of the filling head of the invention; and

Fig. 2 is a bottom view of the device shown in Fig. 1 of the drawings.

In the drawings, it will be seen that the filling head 10 of the invention is formed with an outer shell 11 defining a filling chamber 12, having an open bottom 14, which is designed to fit over a thermoplastic resin cap 16 having a relatively stiff side wall 17 and a flat top will 18. As is shown in the drawings, the bottom 14 of the shell 11 is adapted to fit against the top 20 of a container to which the resin cap 16 is attached.

Positioned within the shell 11 are two substantially semicircular clamps 22 and 23, respectively, both of which are provided with a series of points 24 so as to enable these clamps to fasten tightly against the side wall 17 of the cap 16. The clamp 22 is held in a substantially rigid position within the shell 11 by means of pins 25 while the clamp 23 is movably attached to a handle 27 positioned outside the shell 11 by means of a threaded shaft 28 projecting through a threaded bushing 29 attached to the shell 11, as shown in Fig. 2. By virtue of this construction, the clamp 23 can be moved either against or away from the wall 17 of the cap 16 by merely turning this handle 27. The points 24 upon both of the clamps 22 and 23 are preferably made small enough so that they do not puncture the wall 17 of the cap 16.

Within the shell 11, immediately opposite the open bottom 14, there is positioned a steam chamber 33 possessing aligned wall openings 34 which are adapted to carry a sliding cutter-filling tube 35. Appropriate seals 36 are provided within the walls of the chamber 33 surrounding the openings 34 so as to prevent steam leakage from this chamber. A steam inlet and a steam outlet 37 and 38, respectively, are also provided within the walls of the chamber 33 for the obvious purpose of introducing steam to this chamber and removing spent steam from it.

The filling tube 35 carries at its lower extremity curved side openings 41 and a pointed knife 42, which is adapted to puncture the top wall 18 of the resin cap 16 and to introduce material into the container to which such a cap is attached. The upper end of the filling tube 35 is adapted to pass within aligned openings 43 in a second steam chamber 45 within the walls of which there are placed appropriate seals 46 of a conventional type. The upper end of the steam chamber 45 is provided with a union joint 48 attached to an outer, threaded nut 49, which is designed to be connected to an appropriate source of food products which are to pass through the filling head 10. As seen in Fig. 1 of the drawings, the filling tube 35 contains an open top end 51, which projects into a cavity 50 in the union joint 48. An appropriate handle 52 is carried by filling tube 35, intermediate the steam chambers 33 and 45, for a purpose which will be more fully explained. This latter steam chamber is supported with relation to the shell 11 by appropriate bolts 53.

The shell 11 contains steam inlets 54 which are directed towards the position normally occupied by the top wall of the resin cap 16. Further, this shell is normally provided with apertures 55 near its lower extremity adjacent to the shell bottom 14 for removal of any surplus steam placed within this shell. Bar-like sealing electrodes 58 are supported within the chamber 12 by means of bar-like supports 59 and 60 passing through an insulated bushing 61 and a metal sleeve 62, respectively. The support 59 contains a projecting electrode terminal 64 and is attached by means of an insulator 65 to an air cylinder 66. The other support 60 is attached directly to a second air cylinder 67.

In using the device of the invention, the filling head 10 is placed with respect to the top of the container 20, as shown in Fig. 1 of the drawings, and the handle 27 is rotated so as to fasten the clamps 22 and 23 firmly against the side wall 17 of the resin cap 16. Then steam is introduced through the inlets 54 into the chamber 12, sterilizing this chamber and all items within it. The excess or spent steam from this operation escapes to the air through the apertures 55. During this sterilization and throughout the use of the filling head 10, steam is continuously passed through the steam chambers 33 and 45 so as to sterilize the portions of the filling tube 35 within these chambers.

Next, the handle 52 is pressed downward against a resilient bumper 69 positioned on top of the chamber 33, forcing the knife 42 to cut the top wall 18 of the resin cap 16, introducing the curved openings 41 within this cap. At this point, an appropriate valve (not shown) is opened allowing the material to pass into the union joint 48, the filling tube 35, the resin cap 16 and a connected sterile container. As soon as this container is filled, the filling tube 35 is pulled upward a short distance and the air cylinders 66 and 67 are actuated by valve means (not shown), forcing the sealing electrodes 58 against the side wall 17 of the cap 16, collapsing this side wall. At this point, a high frequency electric field is applied across the electrodes, fusing the side wall 17 shut. The air cylinders 66 and 67 are then actuated by the valve means in such a manner as to cause these electrodes to revert to their original positions. The filling tube 35 is pulled upward to its initial postion and the handle 27 is next rotated, releasing the clamps 22 and 23 from the wall 17. The filling head 10 can then be removed for use in filling another container.

It will be at once apparent to those skilled in the art that a number of secondary devices can be used with the invention in order to govern the operation of the instant filling head described. Thus, for example, electric or electronically governed valves can easily be employed to control the flow of air to the air cylinders 66 and 67. Similarly actuated valves can be employed to govern the flow of liquid into the filling head 10 and to purge or sterilize the parts of this head coming in contact with liquid as desired. Such modifications are deemed to be within the skill of the art and, therefore, are not to be specifically enumerated herein. All such changes, adaptations and modifications are deemed to be part of the present invention insofar as they are defined by the appended claims.

I claim as my invention:

1. A new and improved filling head for aseptically filling a container, including: a shell defining a filling chamber having an open bottom, a top and sides; means defining a steam chamber having a steam inlet and a steam outlet and aligned openings leading to said filling chamber; a movable filling tube projecting into said filling chamber through said aligned openings; a knife attached to said tube within said filling chamber; opposed clamps positioned within said filling chamber; adjustable means projecting through said shell for moving at least one of said clamps; opposed sealing members positioned within said filling chamber between said bottom and said clamps; and means projecting through said shell for moving said sealing members with respect to one another.

2. A new and improved filling head for aseptically filling a container, including: a shell defining a filling chamber having an open bottom, a top and sides; means defining a steam chamber having a steam inlet and a steam outlet and means defining aligned openings leading to said filling chamber positioned within said top; a movable filling tube projecting into said filling chamber through said aligned openings; a knife attached to said tube within said filling chamber; means defining a steam inlet to said filling chamber within said shell; opposed clamps positioned within said filling chamber; adjustable means projecting through said shell for moving at least one of said clamps; opposed sealing members positioned within said filling chamber between said bottom and said clamps; and means projecting through said shell for moving said sealing members with respect to one another.

3. A device as defined in claim 2 wherein said means projecting through said shell for moving said sealing members are rods and wherein each of said rods is attached to an air cylinder for moving said rods and said sealing members.

4. A device as defined in claim 3 wherein one of said rods is insulated from said shell, and wherein terminal means are attached to said rod, and wherein said rod is attached to an air cylinder by an electrical insulator.

5. A new and improved filling head for aseptically filling a container, including: a shell defining a filling chamber having an open bottom, a top and sides; means defining a steam chamber within said top, having a steam inlet and a steam outlet and means defining aligned openings leading to said filling chamber; a movable filling tube projecting into said filling chamber through said aligned opening; means attached to said filling tube outside said shell for moving said filling tube with respect to said shell; a knife attached to said tube within said filling chamber; means defining a steam inlet to said filling chamber within said shell; opposed clamps positioned within said filling chamber; adjustable means projecting through said shell for moving at least one of said clamps; opposed sealing members positioned within said filling chamber between said bottom and said clamps; and means projecting through said shell for moving said sealing members with respect to one another.

6. A new and improved filling head for aseptically filling a container, including: a shell defining a filling chamber having an open bottom, a top and sides; means defining a first steam chamber within the said top, having a steam inlet and a steam outlet and means defining aligned openings leading to said filling chamber; means defining a second steam chamber positioned externally of said shell, said second steam chamber comprising a steam inlet, a steam outlet and means defining openings which are aligned with said openings in said first steam chamber; a movable filling tube projecting into said filling chamber through said aligned openings in said steam chambers; a knife attached to said filling tube within said filling chamber; means defining a steam inlet to said filling chamber within said shell; opposed clamps positioned within said filling chamber; adjustable means projecting through said shell for moving at least one of said clamps; opposed sealing members positioned within said filling chamber between said bottom and said clamps; means projecting through said shell for moving said sealing members with respect to one another; means attached to said filling tube outside said shell between said first and said second steam chamber for moving said filling tube with respect to said shell; and union means positioned adjacent to said second steam chamber for introducing material into said filling tube, said union means including a cavity containing an end of said filling tube.

7. A device for aseptically filling a container, including: shell means defining a filling chamber having an open bottom, a top, and sides; steam chamber means rigidly associated with said top and defining a steam chamber separate from said filling chamber and having aligned openings, one of which communicates with said filling chamber; steam inlet and outlet means communicating with said steam chamber; a reciprocable filling tube projecting through said steam chamber and said aligned openings into said filling chamber; cutting means attached to the end of said tube in said filling chamber; means for reciprocating said filling tube; and sealing means in said filling chamber.

8. A device for aseptically filling a container, including: shell means defining a filling chamber having an open bottom, a top, and sides; first steam chamber means rigidly associated with said top and defining a steam chamber separate from said filling chamber and having aligned openings, one of which communicates with said filling chamber; steam inlet and outlet means communicating with said first steam chamber; second steam chamber means positioned above and spaced from said first steam chamber and defining a second steam chamber having steam inlet and outlet means; a reciprocable filling tube projecting through said first steam chamber and said aligned openings into said filling chamber and the upper end thereof projecting into said second steam chamber; cutting means attached to the end of said tube in said filling chamber; means between said steam chambers for reciprocating said filling tube; sealing means in said filling chamber; and means connected with said second steam chamber means for introducing an aseptic product into the upper end of said filling tube.

References Cited in the file of this patent
UNITED STATES PATENTS

| | | |
|---|---|---|
| 1,270,797 | Dunkley | July 2, 1918 |
| 2,185,191 | Gray et al. | Jan. 2, 1940 |
| 2,503,147 | Applezweig | Apr. 4, 1950 |
| 2,575,863 | Clifcorn | Nov. 20, 1951 |